Figure 1:
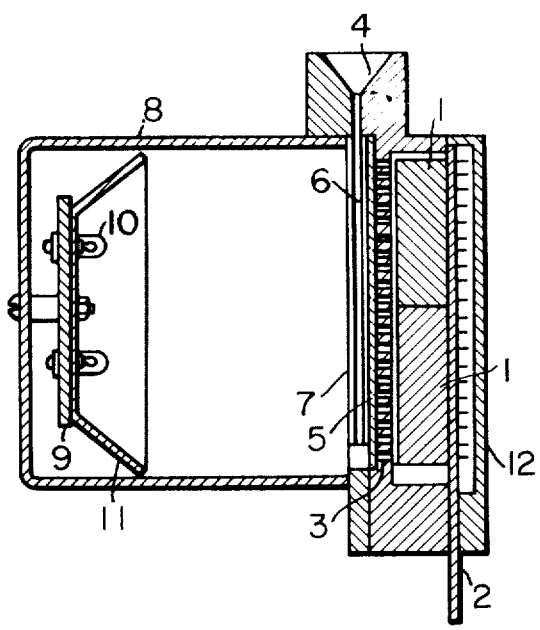

United States Patent [19]

Yamashita et al.

[11] 3,943,337
[45] Mar. 9, 1976

[54] PHOTOELECTRIC PUNCHED CARD READING DEVICE

[75] Inventors: Toshio Yamashita, Hirakata; Toshiro Kotake, Higashi-Osaka; Nobuo Hasegawa, Uji; Manabu Yoshida, Osaka; Saburo Kitamura, Kyoto, all of Japan

[73] Assignee: Matsushita Electric Industrial Company, Ltd., Osaka, Japan

[22] Filed: Apr. 1, 1974

[21] Appl. No.: 456,472

Related U.S. Application Data

[63] Continuation of Ser. No. 262,288, June 13, 1972, abandoned.

[30] Foreign Application Priority Data

June 17, 1971 Japan............... 46-44177

[52] U.S. Cl................ 235/61.11 E; 340/173 LS
[51] Int. Cl.$^2$............... G06K 7/10; G11B 7/00
[58] Field of Search........ 235/61.11 E; 340/146.3 F, 340/146.3 G, 173 LS; 250/555, 566, 568, 569

[56] References Cited
UNITED STATES PATENTS

| 3,328,589 | 6/1967 | Ferguson, Jr. | 235/61.11 E |
| 3,375,348 | 3/1968 | Goldstern | 235/61.11 E |
| 3,532,859 | 10/1970 | LaPlume | 235/61.11 E |
| 3,689,900 | 9/1972 | Chen | 235/61.11 E |

OTHER PUBLICATIONS

Arrabito et al., Security Lock–Actuating System; IBM Tech. Bull., Vol. 12, No. 9, Feb. 1970, pp. 1473–1474.

*Primary Examiner*—Daryl W. Cook
*Attorney, Agent, or Firm*—Stevens, Davis, Miller & Mosher

[57] ABSTRACT

A photoelectric punched card reading device adapted to insert the punched card by hand, for reading the punched card photoelectrically in a static state comprising a matrix of light sensors each adapted to be in register with a hole in a punched card, an aperture mask in close contact with the light sensor matrix a card loading section having, a punched card insertion slot for holding a punched card in correct position with respect to the light sensor matrix and aperture mask, and a light source for uniformly illuminating the light sensor matrix, wherein the card loading section, the light sensor matrix and the light source are assembled integrally.

1 Claim, 2 Drawing Figures

PHOTOELECTRIC PUNCHED CARD READING DEVICE

This is a continuation of application Ser. No. 262,288, filed June 13, 1972, now abandoned.

This invention relates to photoelectric punched card reading devices.

The detection of holes of punched cards has heretofore been done mechanically by utilizing sensing pins or brushes to actuate an electrical circuit throughholes in a punched card. This method, however, is prone to misreadings due to dust and also to damage of the punched card. Recently, there have been proposed photoelectric detection methods, where the punched card is exposed to light and light transmitted through the card is detected by light sensor means. The light sensor means use such elements as silicon solar cells, photo-transistors, and cadmium sulfide (CdS) photo-conductive elements. The CdS photoconductive elements, however, have heretofore not been feasible as light sensors from the standpoints of dimensions and performance. Therefore, as light sensors silicon solar cells and photo-transistors have been mostly used. The silicon light sensor, however, is very expensive, and if silicon elements are used as a two-dimensional matrix, it would amount up to about one half the cost of the whole reading unit. For this reason, the usual punched card reader has only a single row of 10 to 12 light sensor elements, and passed which the punched cards are moved for reading. In this device, however, a mechanism for feeding the punched card and extra electric circuit means are required. In this aspect, an inexpensive photoelectric punched card reader capable of static reading of punched cards has been desired.

In the case of static reading, the response time is of small importance, so that inexpensively manufactured CdS photo-conductive elements can well be employed. However, with the usual CdS photo-conductive element having a planar structure with electrodes formed on the same side as the photo-sensitive layer, about one half of the light receiving area is covered with electrode metal. Therefore, where small photo-conductive elements are closely arranged, the light receiving area of one element is naturally very small and the available photo-current is very low.

On the other hand, with the sandwich-type CdS photo-conductive element which has been proposed earlier by the inventors of the present invention, the electrodes are formed on upper and lower areas of the photo-sensitive layer, with one electrode constituted by a transparent conducting film of tin oxide. Thus, the light receiving area is free from any electrode shading the light, and the interelectrode distance can be reduced down to about one tenth of that of the conventional element. With the sandwich-type CdS photo-conductive element, it is thus readily possible to obtain high light sensitivity with a small light receiving area, so that this element is most suitable as a light sensor for static reading.

According to the invention, there is provided a photo-electric punched card reading device comprising a light detecting section, a punched card insertion slot and a light source, said light detecting section comprising a light sensor matrix consisting of a plurality of sandwich-type CdS photo-conductive elements arranged two-dimensionally such that each element will be in register with a hole in a puched card, said elements being electrically connected altogether in a matrix form with each element in series with an associated diode.

The photo-electric punched card reading device according to the invention can provide the following features:

1. Absolute static reading is possible.
2. Since no mechanical contacts are involved, high reliability can be ensured.
3. The sensitivity is very high, and direct connection to a logic circuit is possible.
4. A light source simple in construction and consuming little power is sufficient for use in card reading. Thus, temperature rise is small, giving no adverse effects.
5. Since the device is small in size, it may be readily assembled into a related equipment.
6. The crosstalk is small, and the signal-to-noise ratio is large. Thus, it is possible to read even IBM standard paper punched cards.
7. Because of the absence of movable parts, excellent durability can be ensured. Also, the operation is very simple.

Figure 2:
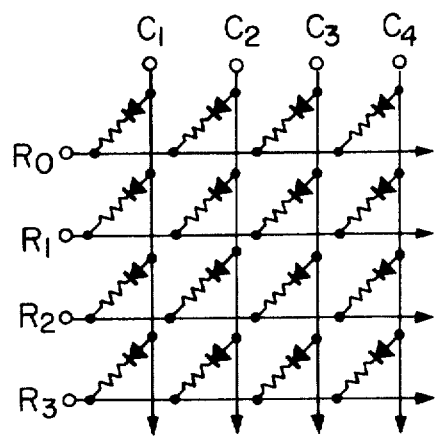

For the invention to be more fully understood, it will now be described in connection with the accompanying drawings, in which:

FIG. 1 is a pictorial sectional view showing the inner construction of a photo-electric punched card reading device embodying the invention; and FIG. 2 is a connection diagram showing a CdS light sensor matrix employed in the reading device according to the invention.

FIG. 1 shows a sectional view of a photo-electric punched card reading device according to the invention. Reference numeral 1 designates a CdS light sensor matrix consisting of CdS photo-conductive elements arranged on a printed circuit board 2 in a matrix form of 10 rows and 10 columns, and electrically connected in a manner as shown in FIG. 2. Each element in the matrix will be in register with a hole in a puched card. All the bus bars for the individual rows and columns of the matrix are provided at one edge of the printed circuit board. Numeral 3 designates an aperture mask formed with apertures each adapted to be in register with a hole in a punched card. It is made of a black resin material and is integral with a card loading section 4 having a card insertion slot. Numeral 5 designates a transparent glass plate serving as a protective cover to protect the aperture mask. The card insertion section 4 includes spacers 6 provided at left and right edges of the card insertion slot provide for a space conforming to the thickness of a punched card to be inserted. It also includes a plate 7 laminated on said spacers to hold a card by side edges. Numeral 8 designates a lamp housing with the inner surface provided with a black mat coating to prevent reflection of light. Numeral 9 designates a lamp support plate carrying two to six small lamps 10 connected in parallel. Numeral 11 designates a reflector of such shape that it projects as much parallel light flux as possible to the light sensor matrix. Numeral 12 designates a back cover to prevent dust from attaching to the sensor matrix.

There are two methods of reading a punched card with the photo-electric punched card reading device described above.

In one of the methods, the bus bars for the individual columns are successively scanned with pulses, and parallel outputs are taken out from bus bars for the rows.

This corresponds to the conventional case of moving a punched card in the direction of a row of light sensors for reading. This method is however different from the conventional method in that the individual columns are electrically scanned with pulses in place of mechanical movement of a punched card.

In the other method, pulses are supplied to the bus bars of both the columns and rows. In this case, the signals from all the light sensors may be serially taken out one after another.

In either case, the light source is always held on. Without any punched card loaded, therefore, all the light sensors are uniformly illuminated with light coming through the respective apertures of the aperture mask. When a punched card is loaded in the card insertion slot, a light sensor in register with a punched hole is exposed to light, while a light sensor facing part of the punched card without a punched hole receives only slightly transmitted light since light is mostly interrupted by the card. The punched cards are usually made of paper or plastic material. With paper punched cards, the signal-to-noise ratio (the ratio between the resistance of a light sensor facing the material of the punched card and that of a light sensor facing a hole in the punched card) is usually inferior due to a high transmission of the paper. With plastic punched cards, the transmission is usually lower than that of the paper though it varies depending upon the color and thickness of the card, so that the signal-to-noise ratio may be increased compared to the case of the paper card. Besides the material of the punched card, the signal-to-noise ratio also depends upon the location of the mask aperture. Placing an aperture mask having small apertures directly in front of the light sensor matrix as in the illustrated device according to the invention is extremely effective from the standpoint of improving the signal-to-noise ratio.

There are various light sources which may be used for uniformly illuminating the light sensor matrix. From the signal-to-noise standpoint the ideal is to project parallel light flux in a direction normal to the light receiving face of the light sensor matrix. Light from a single spot light source may be converted into parallel light flux through a lens. To illuminate the entire light receiving face from a spot light source uniformly, however, a considerably large size lens and a considerable distance between the light source and the light sensor matrix are required, so that the overall size of the reading device would be undesirably increased.

According to the invention, with a plurality of small lamps used together with a reflector it is possible to provide approximately parallel light flux without substantially increasing the overall size of the reading device. Although the use of a fluorescent lamp is conceivable, it is not suitable to small-size punched card readers because at present no small-size fluorescent lamps with rating of 4 watts or lower are commercially available. In case of large size punched card readers such as those for reading IBM standard cards, however, it is possible to use a single fluorescent lamp with rating of about 6 watts. In such case, it may be disposed together with a reflector at a suitable distance from, for instance, a 12-row 80-column light sensor matrix.

The features of the invention as described above are that the punched card static reading device is constructed by combining integrally the three parts as follows, that is:

1. the main body including the card loading section and the aperture mask having a plurality of holes corresponding to perforated holes on cards inserted in said loading section, the card loading section and the aperture mask being assembled integrally,
2. the light sensor matrix plate including the printed circuit board and a plurality of light sensors having diode characteristics arranged on the board, the arrangement of the light sensors comprising a matrix corresponding to the holes in the aperture mask, wherein a plurality of bus bars are arranged in lines and rows, each of said light sensors being connected between a line and a row of said plurality of bus bars and each of the bus bars having a terminal at the edge face of the board, and
3. the light source box including a plurality of lamps and the reflector for illuminating each of the sensors with uniform and parallel light beams.

With the construction as stated above, each of the three components can be easily disassembled from and assembled to the reading device. Thus, the following advantages can be attained:

a. Relative positioning of the card punched holes, the apertures and the sensors is facilitated.

b. Since the printed circuit board can be readily removed for replacement, the apparatus is easily adapted to various cards and punched holes.

c. Repair in case of the failure of the sensors or lamps is facilitated.

d. Cross-talk is reduced.

It should be further noted that since the reflector is used to convert the light from the light source to parallel light beams, the amount of light illuminating the photo-conductors is much more than when the diffusing light beam is used; accordingly, a smaller size of lamps can be used. Thus, the amount of heat generated by the device can be reduced.

Also, since the amount of illumination light is increased, the response of the sensors becomes more rapid, thus, the device can read the punched card without erroneous operation and with high reliability even when the card is rapidly inserted or taken out.

What we claim is:

1. A photoelectric punched card reading device comprising an integral combination of a main body including a card loading section and an aperture mask having a plurality of holes corresponding to perforated holes on cards inserted in said loading section, said card loading section and said aperture mask being assembled integrally; a light sensor matrix plate including a printed circuit board and a plurality of light sensors having diode characteristics arranged on said board, the arrangement of the light sensors comprising a matrix corresponding to the holes in the aperture mask, wherein a plurality of bus bars are arranged in lines and rows, each of said light sensors being connected between a line and a row of said plurality of bus bars and each of said bus bars having a terminal at the edge face of said board; and a light source box including a plurality of lamps and a reflector for illuminating each of said sensors with uniform and parallel light beams.

* * * * *